United States Patent [19]

Nagao et al.

[11] 4,417,270

[45] Nov. 22, 1983

[54] WIDE BAND CHROMINANCE DEMODULATOR WITH COLOR NOISE REDUCTION FUNCTION

[75] Inventors: Nobuya Nagao; Takashi Inoue, both of Fukaya, Japan

[73] Assignee: Tokyo Shibaura Denki Kabushiki Kaisha, Kawasaki, Japan

[21] Appl. No.: 337,753

[22] Filed: Jan. 7, 1982

[30] Foreign Application Priority Data

Jan. 28, 1981 [JP]   Japan .................................. 56-12075

[51] Int. Cl.³ .............................................. H04N 5/37
[52] U.S. Cl. ........................................ 358/23; 358/36
[58] Field of Search ...................... 358/23, 26, 27, 24, 358/25, 28, 29, 30, 36

*Primary Examiner*—Michael A. Masinick
*Attorney, Agent, or Firm*—Cushman, Darby & Cushman

[57] ABSTRACT

A video circuit is responsive to a TV radio wave with a given field strength. The video circuit provides a composite color video signal contained in the TV radio wave and generates a control signal corresponding to the field strength of TV radio wave. A signal separator is coupled to the video circuit. The signal separator separates I and Q signals from the composite color video signal. A color decoder is coupled to the signal separator and responsive to the I and Q signals. The color decoder generates color difference signals. The chrominance demodulator includes an I signal processor coupled to the video circuit, signal separator and color decoder. The chrominance demodulator composes a controlled I signal from the control signal and I signal and provides the color decoder with the controlled I signal. The frequency response characteristic between the I signal and controlled I signal is changed according to the control signal.

7 Claims, 11 Drawing Figures

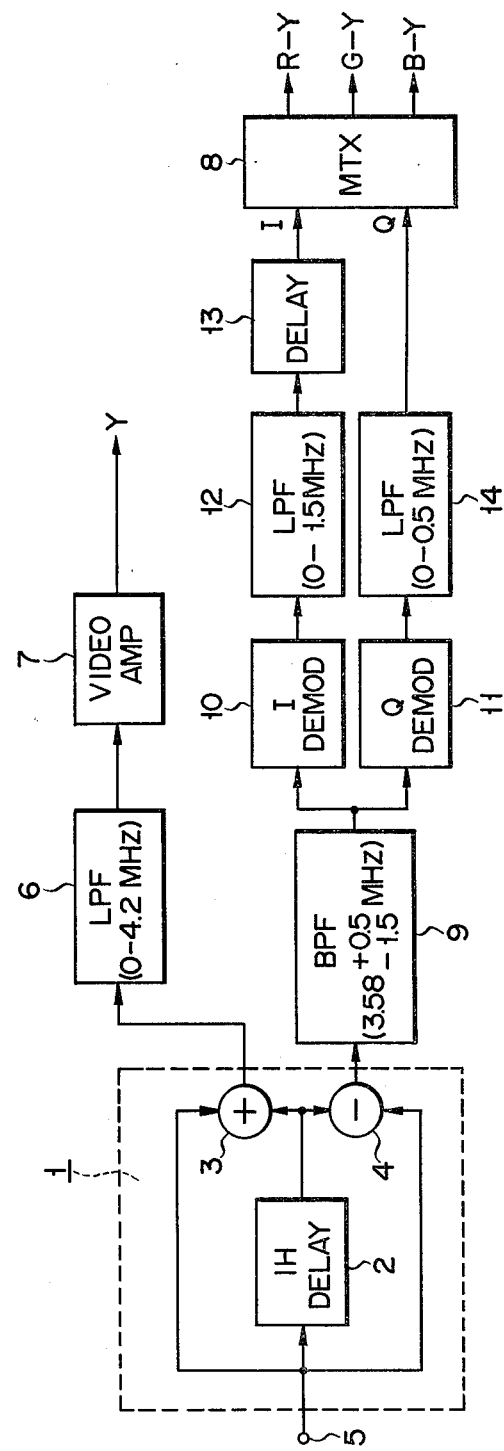
F I G. 1

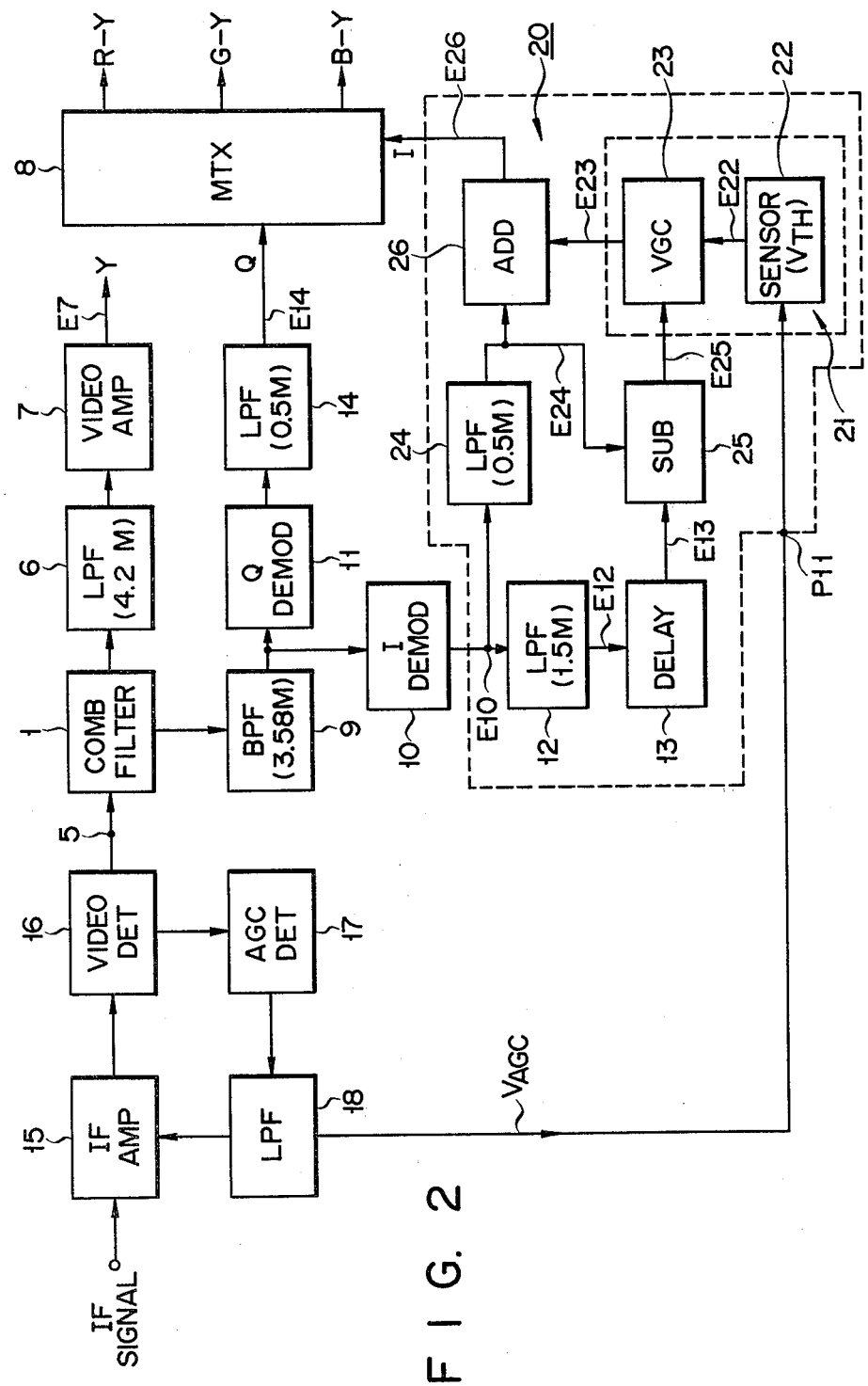
F I G. 2

FIG. 3III

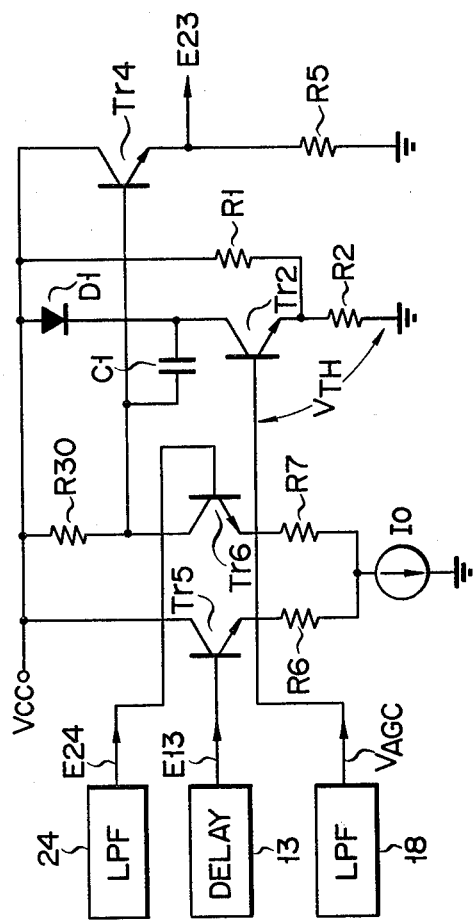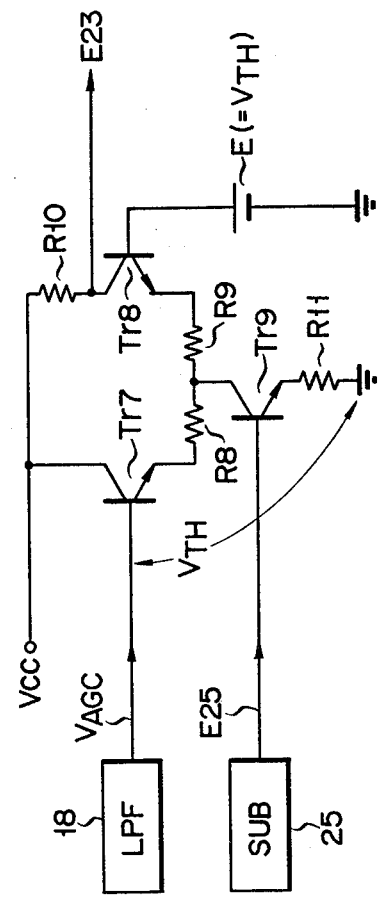
F I G. 4 II          F I G. 4 III

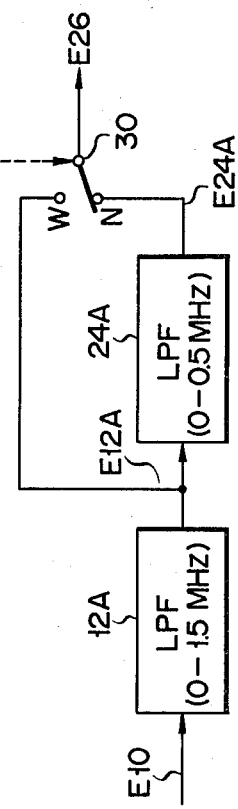
F I G. 5 II
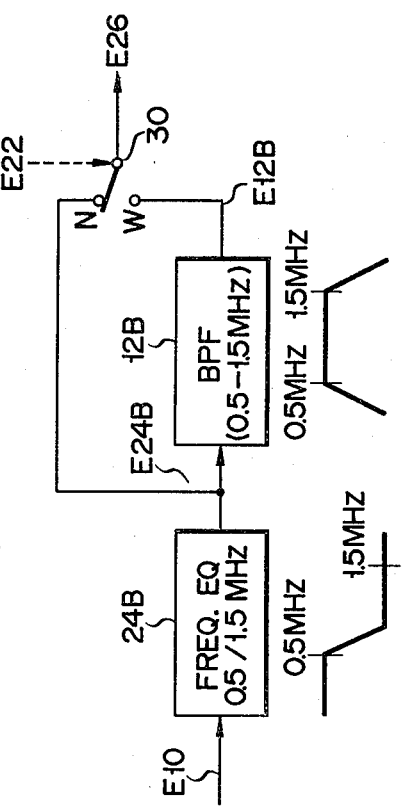
F I G. 5 III
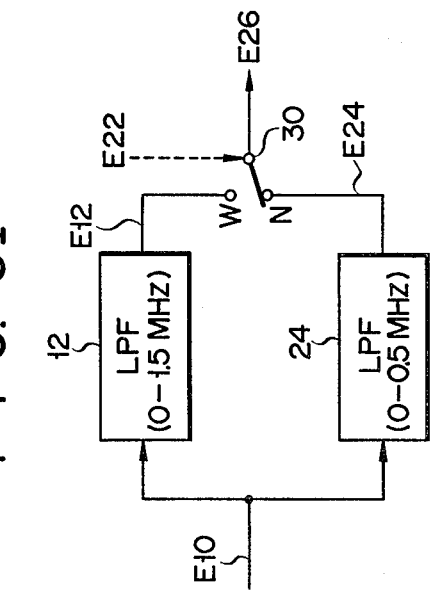
F I G. 5 I

WIDE BAND CHROMINANCE DEMODULATOR WITH COLOR NOISE REDUCTION FUNCTION

BACKGROUND OF THE INVENTION

This invention relates to a wide band chrominance demodulator for a color TV receiver etc., particularly to a wide band chrominance demodulator with color noise reduction function enabling to reduce color noise at weak field strength.

Generally, in a composite color TV signal of NTSC system or the like, a carrier chrominance signal and a luminance signal are multiplexed by a frequency interleaving system, thereby the compatibility of color and monochrome TV receivers is established and a most effective data transmission within a restricted frequency range already assigned is ensured. For the multiplex transmission with frequency interleaving, the chrominance subcarrier frequency for transmitting color difference signals is selected to be an odd number multiple of half of the horizontal scanning frequency, namely the chrominance subcarrier frequency is 3.579545 MHz (hereinafter referred to as 3.58 MHz). Two carrier chrominance signals are respectively obtained from the chrominance subcarrier and two color difference signals by the manner that the chrominance subcarrier is subjected to a suppressed carrier amplitude modulation with the two color difference signals. These carrier chrominance signals are added to the luminance signal to generate a frequency-interleaved signal, and such frequency-interleaved signal is transmitted.

Human visual characteristics depend on kind of color. A human color vision is sensitive to orange-cyanic color and is relatively insensitive to green-magenta color. According to this, the color difference signal of orange-cyanic color is transferred as an I signal having a frequency range of 0-1.5 MHz (wide band), whereas the color difference signal of green-magenta color is transferred as a Q signal having a frequency range of 0-0.5 MHz (narrow band). These I and Q signals are used for suppressed-carrier-amplitude-modulating the chrominance subcarrier.

Generally, in an analog transmission system a S/N ratio over 3 MHz is of quite low grade. Since the frequency of chrominance subcarrier is high, i.e. 3.58 MHz, color noise, which is caused mainly by white noise at weak field strength, remarkably increases. Particularly, in a wide band chrominance demodulator of IQ demodulation system, since the S/N ratio of high frequency components of I signal (wide band) is liable to degrade, color noise, e.g. color snow, is considerably in the forefront. Such noise degradation will be explained referring to FIG. 1 as follows.

In FIG. 1 a comb filter 1 includes a delay circuit for one horizontal scanning period (a 1H delay circuit) 2, an adder 3 and a subtractor 4. The 1H delay circuit 2 may be a glass delay line (ultrasonic delay line) or a CCD delay circuit. A composite color video signal is applied via a signal supply terminal 5 to an input terminal of filter 1. The composite color video signal is inputted to respective circuit elements 2, 3 and 4. An output signal of delay circuit 2 is applied to adder 3 and subtractor 4. Adder 3 outputs a luminance signal component, and subtractor 4 outputs a chrominance signal component. The output signal of adder 3 is supplied to a video amplifier 7 through a low pass filter (LPF) 6 having a cutoff frequency of 3.58 MHz. Video amplifier 7 provides a luminance signal Y.

The output signal of subtractor 4 is inputted to a band pass filter (BPF) 9. BPF 9 permits to pass therethrough frequency components of 3.58+0.5/−1.5 MHz. A filtered output signal of BPF 9 or a carrier chrominance signal is inputted to an I axis demodulator 10 and a Q axis demodulator 11. An I signal obtained from I demodulator 10 is applied to a color matrix circuit 8 via a LPF 12 having 1.5 MHz cutoff and a delay line 13. A Q signal obtained from Q demodulator 11 is applied via a LPF 14 having 0.5 MHz cutoff to matrix circuit 8.

The wide band chrominance demodulator shown in FIG. 1 will operate as follows.

A composite color video signal occupies a frequency range of DC-4.2 MHz. Within this range, a RF carrier is carrier-suppressed-modulated by Y signal, and a chrominance subcarrier whose frequency is deviated by 3.58 MHz from the RF carrier frequency is also carrier-suppressed-modulated by two color difference signals, i.e. I and Q signals. The modulated Y signal and chrominance subcarrier are frequency-interleaved and then transmitted, as already mentioned. A Y signal component of the composite color video signal is obtained from the output terminal of adder 3. Useless frequency components being attendant on the Y signal are filtered out through LPF 6. Video amplifier 7 amplifies the filtered Y signal to provide the luminance signal Y.

A chrominance signal component of the composite color video signal is obtained from the output terminal of subtractor 4. Useless frequency components of the chrominance signal are filtered out by BPF 9 having a pass-band of about 2.1-4.1 MHz. BPF 9 provides I and Q demodulators 10 and 11 with the filtered carrier chrominance signal. I demodulator 10 demodulates the I signal component of inputted chrominance signal to provide a demodulated I signal. The demodulated I signal is applied to matrix circuit 8 via LPF 12 having 1.5 MHz cutoff and delay line 13 for compensating the group delay time discrepancy of I and Q signals. Q demodulator 11 demodulates the Q signal component of inputted chrominance signal to provide a demodulated Q signal. The demodulated Q signal is applied to LPF 14 having 0.5 MHz cutoff. LPF 14 provides matrix circuit 8 with Q signal being free from useless frequency components. Matrix circuit 8 composes color difference signals (R−Y), (G−Y) and (B−Y) from inputted I and Q signals.

In the chrominance demodulator as shown in FIG. 1, since a transmission frequency range of I signal covers the maximum frequency of transmitted I signal, i.e. 1.5 MHz, the color resolution will be best. This is satisfactory when a strong field strength is available. However, when the field strength is weak, color noise caused mainly by white noise of higher frequency ($\gtrsim 0.5$ MHz) increases to a high degree. Although the color noise may be reduced by restricting the frequency range of chrominance signal (e.g. 0.5 MHz or less), such frequency restriction causes the TV set to provide "chrominance smear" and thus to degrade the picture quality.

SUMMARY OF THE INVENTION

It is accordingly an object of this invention to provide a wide band chrominance demodulator with color noise reduction function for color TV system, which enables to reduce color noise at weak field strength and to improve color resolution at strong field strength.

According to the present invention, a wide band chrominance demodulator with color noise reduction function includes a tuner circuit responsive to a TV radio wave for providing a composite color video signal. The tuner circuit also generates a control signal corresponding to the field strength of TV radio wave. The control signal may be an RF or IF AGC signal. The composite color video signal is applied to a signal separator. The separator extracts I and Q signals from the composite color video signal. The frequency spectrum range of I signal is wider than that of the Q signal. Such I signal and the control signal are applied to an I signal processor. The processor has a variable frequency response. The processor outputs a controlled I signal whose frequency spectrum is varied with the change of control signal or the change of field strength of TV radio wave. For instance, the signal level of controlled I signal around 0.5–1.5 MHz at strong field is high, whereas the level of controlled I signal around 0.5–1.5 MHz at weak field is low. However, the signal level of controlled I signal below 0.5 MHz has substantially a flat response. The Q signal and the controlled I signal are supplied to a color matrix circuit. The matrix circuit composes color difference signals (R−Y, G−Y, B−Y) from the Q and controlled I signals.

Since the I signal processor suppresses the higher frequency components (0.5–1.5 MHz) of controlled I signal at weak field strength, color noise caused by white noise of I signal is reduced. Further, since the higher frequency components of controlled I signal at strong field strength may have a high level, the color resolution of reproduced picture will be improved.

BRIEF DESCRIPTION OF THE DRAWINGS

The objects and advantages of the present invention will become apparent to persons skilled in the art from a study of the following description of the accompanying drawings.

FIG. 1 shows a block diagram of a wide band chrominance demodulator being liable to bring on color noise at weak field strength;

FIG. 2 shows a block diagram of a wide band chrominance demodulator according to the present invention;

FIGS. 5I to 5III are modifications of I signal processor 20 shown in FIG. 2.

DETAILED DESCRIPTION OF THE PREFERRED EMBODIMENT

Figure 3I:
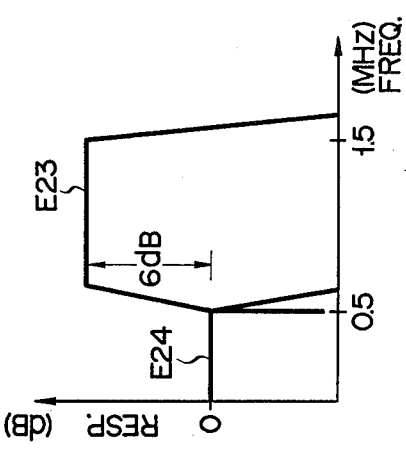
FIGS. 3I to 3III are graphs of frequency response useful for explaining the operation of FIG. 2 configuration.
Figure 3I:
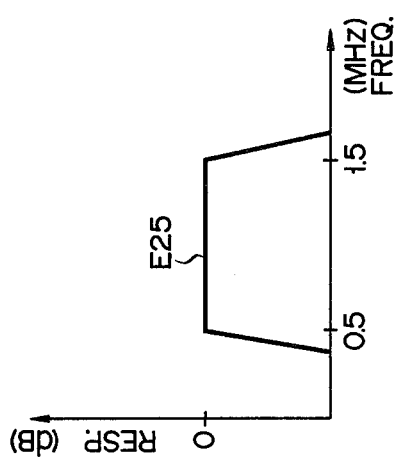

Before proceeding with the description of the embodiments of the invention, it will be understood that like reference symbols are used to designate like portions throughout the drawings for brevity's sake.

FIG. 2 shows a wide band chrominance demodulator of the present invention. In this demodulator an I signal processor 20 provides a controlled I signal E26 having low level higher frequency components at weak field strength and also provides a controlled I signal having high level higher frequency components at strong field strength. The frequency response of controlled I signal E26 depends on an automatic gain control (AGC) signal $V_{AGC}$.

Here, how the AGC signal $V_{AGC}$ is obtained will be explained.

An intermediate frequency (IF) signal outputted from a tuner circuit of TV receiver (not shown) is applied to an IF amplifier 15, IF amplifier 15 provides a video detector 16 with an amplified IF signal. Video detector 16 detects the inputted signal to provide a composite color video signal. The composite color video signal is applied via a signal supply terminal 5 to a comb filter 1 and also applied to an AGC detector 17. AGC detector 17 outputs an impure AGC signal with ripples whose DC level corresponds to the magnitude of composite color video signal, or the magnitude of field strength of TV radio wave. The ripples of impure AGC signal are filtered out through a LPF 18. LPF 18 outputs a pure AGC signal (control signal) $V_{AGC}$. The pure AGC signal $V_{AGC}$ is fedback to IF amplifier 15 and applied to an input terminal P11 of I signal processor 20.

The comb filter 1 extracts from the composite color video signal a luminance signal component and carrier chrominance signal components. The luminance signal component is supplied via a LPF 6 to a video amplifier 7 and video amplifier 7 outputs a luminance signal E7. The carrier chrominance signal components are supplied via a BPF 9 to an I demodulator 10 and a Q demodulator 11. A demodulated output of Q demodulator 11 is filtered through LPF 14 and then applied as a Q signal E14 to a color matrix circuit 8. A demodulated output of I demodulator 10, i.e. and I signal E10, is applied to a LPF 12 having a cutoff frequency 1.5 MHz and a LPF 24 having a cutoff frequency 0.5 MHz. LPF 24 extracts from I signal E10 a first filtered signal E24 containing frequency components of 0–0.5 MHz. LPF 12 extracts from I signal E10 a second filtered signal E12 containing frequency components of 0–1.5 MHz. Signal E12 is inputted to a delay circuit 13. Circuit 13 compensates group delay time characteristics of LPF 12 and provides a delayed I signal E13. Thus, circuit 13 eliminates a group delay time discrepancy between signals E12 and E24. Signals E13 and E24 are inputted to a subtractor 25. Subtractor 25 subtracts signal E24 from signal E13 to provide a difference signal E25 which contains frequency components of 0.5–1.5 MHz.

The control signal $V_{AGC}$ applied to terminal P11 is inputted to a level sensor 22 having a given threshold potential $V_{TH}$. Sensor 22 generates a second control signal E22 when the potential of control signal $V_{AGC}$ exceeds the threshold potential $V_{TH}$. Signal E22 is applied to a variable gain circuit (VGC) 23. Also applied to VGC 23 is the difference signal E25. When signal E22 is not generated ($V_{AGC} < V_{TH}$), the gain of VGC 23 is zero. When signal E22 is generated ($V_{AGC} > V_{TH}$), VGC 23 amplifies difference signal E25 and outputs a controlled difference signal E23. Sensor 22 and VGC 23 form a gain controller 21. Gain controller 21 may have a conventional AGC circuit configuration. The controlled difference signal E23 and the first filtered signal E24 are inputted to an adder 26. Adder 26 adds signal E23 to signal E24 to provide a controlled I signal E26. Signal E26 and aforementioned Q signal E14 are applied to a color matrix circuit 8. Matrix circuit 8 composes three color difference signals R−Y, G−Y and B−Y from signals E14 and E26.

FIGS. 3I to 3III show filtering frequency characteristics of elements 12, 24 and 25 shown in FIG. 2. The frequency response of LPF 12 over 0.5 MHz is different from that of LPF 24 (FIG. 3I). Therefore, subtracting signal E24 from signal E12 with group delay time compensation, or combining signal E24 with signal E13 with antiphase relation, provides a difference signal E25 having a band width of 0.5-1.5 MHz (FIG. 3III). In the FIG. 2 configuration the magnitude or amplitude of difference signal E25 is changed according to the control signal $V_{AGC}$. When the field strength of TV radio wave is weak, the potential of control signal $V_{AGC}$ is lower than a threshold potential $V_{TH}$ of sensor 22 ($V_{AGC} < V_{TH}$), and sensor 22 makes the gain of VGC 23 render substantially zero ($-\infty$ db). In this case the controlled difference signal E23 contain only signal E24 components. When the field strength of TV radio wave is strong, i.e. $V_{AGC} > V_{TH}$, sensor 22 makes the gain of VGC 23 increase so that the frequency response level of signal E23 is 6 dB higher than that of signal E24 (FIG. 3III). Since the TV broadcasting station sends the I signal with 6 dB low level at 0.5-1.5 MHz band, it is necessary to compensate this 6 dB level down at the TV receiver side for ideal IQ demodulation. If a quasi-ideal IQ demodulation is satisfactory, above-mentioned 6 dB compensation may be omitted.

Figure 4I:
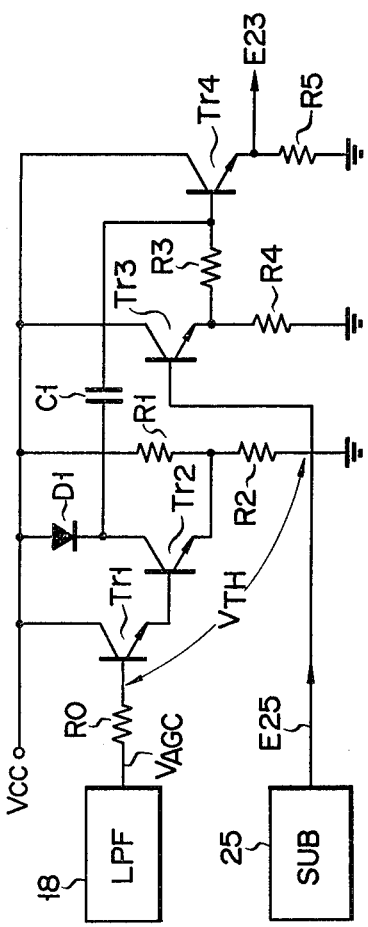
FIGS. 4I to 4III are concrete examples of gain controller 21 shown in FIG. 2.

FIGS. 4I to 4III show examples of circuit configurations of gain controller 21 shown in FIG. 1.

In FIG. 4I a control signal $V_{AGC}$ obtained from LPF 18 is applied via a resistor R0 to the base of an NPN transistor Tr1. Signal $V_{AGC}$ applied to transistor Tr1 is current-amplified thereby to bias the base of an NPN transistor Tr2. The collector of transistor Tr1 is connected to a power source Vcc and the emitter thereof is coupled with the base of transistor Tr2. The collector of transistor Tr2 is connected via the cathode-anode path of a diode D1 to power source Vcc. The emitter of transistor Tr2 is connected to the juncture between respective one ends of resistors R1 and R2. The other end of resistor R1 is connected to power source Vcc and the other end of resistor R2 is grounded. The collector of transistor Tr2 is connected via a capacitor C1 and a resistor R3 to the emitter of an NPN transistor Tr3. The emitter of transistor Tr3 is grounded via a resistor R4 and the collector thereof is connected to power source Vcc. The base of transistor Tr3 is supplied with a difference signal E25 obtain from subtractor 25. The juncture between capacitor C1 and resistor R3 is coupled with the base of an NPN transistor Tr4. The collector of transistor Tr4 is connected to power source Vcc and the emitter thereof is grounded through a resistor R5. The emitter of transistor Tr4 outputs a controlled difference signal E23 containing higher frequency components of I signal E10.

In the circuit of FIG. 4I, transistors Tr1 and Tr2 are turned on when the base potential of transistor Tr1 exceeds a given threshold potential $V_{TH}$. This threshold potential $V_{TH}$ depends on the base-emitter threshold voltage $V_{BE}$ of respective transistors Tr1 and Tr2, resistance ratio of resistors R1 and R2, and the potential of power source Vcc. When transistor Tr2 is rendered conductive ($V_{AGC} > V_{TH}$), capacitor C1 and resistor R3 form a low pass filter which retards or stops the transmission of the higher frequency components (0.5-1.5 MHz) of signal E25. The potential of control signal $V_{AGC}$ increases as the field strength becomes large. If the threshold potential $V_{TH}$ is so selected as to correspond to medium field strength, the chrominance signal or controlled I signal E26 at medium-strong field strength is transmitted with wide band, and the chrominance signal at weak field strength is transmitted with narrow band.

FIG. 4II shows a modification of FIG. 4I circuit. In FIGS. 4I and 4II, common portions are denoted by same numerals in order to omit a redundant explanation.

In FIG. 4II the subtractor 25 is formed of a differential amplifier including NPN transistors Tr5 and Tr6. The collector of transistor Tr6 is connected via a resistor R30 to power source Vcc. The emitters of transistors Tr5 and Tr6 are respectively connected via resistors R6 and R7 to one end of a constant current source Io. The other end of current source Io is grounded. The collector of transistor Tr5 is connected to power source Vcc. In FIG. 4II the resistor R30 has the same function as that of resistor R3 of FIG. 4I. An output signal E13 of delay circuit 13 is applied to the base of transistor Tr5. Applied to the base of transistor Tr6 is a lower band I signal E24 obtained from LPF 24. The subtracted output signal or difference signal E25 appears at the collector of transistor Tr6. The signal E25 is applied to the base of transistor Tr4.

In FIG. 4II circuit, resistor R30 and capacitor C1 forms a LPF when $V_{AGC} > V_{TH}$.

FIG. 4III shows another modification of FIG. 4I circuit. In FIG. 4III the gain of VGC 23 varies linearly with the potential of control signal $V_{AGC}$. A control signal $V_{AGC}$ obtained from LPF 18 is applied to the base of an NPN transistor Tr7. Applied to the base of an NPN transistor Tr8 is a bias potential E which defines the given threshold potential $V_{TH}$. The collector of transistor Tr7 is connected to power source Vcc and the collector of transistor Tr8 is coupled via a resistor R10 to power source Vcc. Outputted from the collector of transistor Tr8 is the controlled difference signal E23. The respective emitters of transistors Tr7 and Tr8 are connected through resistors R8 and R9 to the collector of an NPN transistor Tr9. The emitter of transistor Tr9 is grounded via a resistor R11. The difference signal E25 obtained from subtractor 25 is inputted to the base of transistor Tr9.

FIGS. 5I to 5III show modifications of I signal processor 20 shown in FIG. 2. In FIG. 5I the I signal E10 obtained from I demodulator 10 passes through either LPF 12 (fc=1.5 MHz) or LPF 24 (fc=0.5 MHz). When the field strength is weak, I signal E10 passes LPF 24 and the contact N of a selector 30 which may be an electronic FET switch circuit, for example. When the field strength is strong, I signal E10 passes LPF 12 and the contact W of selector 30. The switching of selector 30 is controlled by the signal E22 obtained from sensor 22 (FIG. 2). Selector 30 provides the controlled I signal E26.

In FIG. 5II, I signal E10 passes a LPF 12A (fc=1.5 MHz), a LPF 24A (fc=0.5 MHz) and the contact N of selector 30 at weak field strength. At strong field strength, I signal E10 passes only LPF 12A and the contact W of selector 30.

In FIG. 5III, the I signal E10 passes a frequency equalizer 24B and the contact N of selector 30 at weak field strength. The frequency response of equalizer 24B over 0.5 MHz is lower than that under 0.5 MHz. Namely, equalizer 24B is a sort of high cut or low pass filter. When the field strength is strong, I signal E10 passes equalizer 24B and BPF 12B whose pass band is 0.5-1.5 MHz. BPF 12B includes an amplifier for enhancing the level of 0.5-1.5 MHz components. The output signal E12B of BPF 12B is obtained through the contact W of selector 30.

FIGS. 4I-4III and 5I-5III teach that the key of the invention is to suppress the higher frequency components (0.5-1.5 MHz) of I signal at weak field strength for reducing color noise, and to increase the higher frequency components at medium-strong field strength for improving the resolution and sharpness of color picture.

According to the present invention, since the band of chrominance signal at weak field strength is narrow but the band of chrominance signal over weak field strength is wide, it is possible to reduce color noise and also to improve resolution and sharpness of color picture.

It will be apparent to those skilled in the art that various modifications and variations could be made in the chrominance demodulator of the invention without departing from the scope of the claimed invention.

What we claim is:

1. A wide band chrominance demodulator with color noise reduction function comprising:
   (a) circuit means responsive to a TV radio wave with a given field strength, for providing a composite color video signal contained in said TV radio wave, and generating a control signal corresponding to the field strength of said TV radio wave;
   (b) separator means coupled to said circuit means, for separating I and Q signals from said composite color video signal;
   (c) processor means coupled to said circuit means and separator means and responsive to said control signal and I signal, for providing a controlled I signal, wherein the frequency response characteristic between said I signal and said controlled I signal is changed according to said control signal; and
   (d) means coupled to said separator means and processor means and responsive to said Q signal and controlled I signal, for generating color difference signals.

2. A chrominance demodulator of claim 1, wherein said processor means includes
   first filter means resonsive to said I signal for extracting from said I signal a first frequency component of said I signal to provide a first filtered signal;
   second filter means responsive to said I signal for extracting from said I signal a second frequency component of said I signal to provide a second filtered signal;
   subtraction means coupled to said first and second filter means, for subtracting said first filtered signal from said second filtered signal or vice versa to provide a difference signal;
   gain control means coupled to said subtraction means and responsive to said control signal, for controlling the magnitude of said difference signal according to the magnitude of said control signal, and providing a controlled difference signal; and
   addition means coupled to said first filter means and said gain control means, for adding said controlled difference signal to said first filtered signal to provide said controlled I signal.

3. A chrominance demodulator of claim 2, wherein said processor means further includes
   means connected between said second filter means and said subtraction means, for compensating a group delay time discrepancy between said first and second filtered signals.

4. A chrominance demodulator of claim 2 or 3, wherein said gain control means includes
   sensor means coupled to said circuit means and responsive to said control signal and having a given threshold potential, for generating a second control signal when the potential of said control signal exceeds said given threshold potential; and
   variable gain means coupled to said subtraction means, addition means and sensor means, and responsive to said second control signal, for increasing the magnitude of said controlled difference signal according to said second control signal, the magnitude of said controlled difference signal being decreased when the potential of said control signal goes down from said given threshold potential.

5. A chrominance demodulator of claim 4, wherein the gain of said variable gain means is such that a frequency response between said I signal and said controlled I signal is substantially flat under a predetermined frequency and is 6 dB level-increased from the flat portion over said predetermined frequency when the potential of said control signal exceeds said given threshold potential, and that said frequency response of a specific frequency region containing frequency components of said difference signal is lowered by given degree when the potential of said control signal goes down from said given threshold potential.

6. A chrominance demodulator of claim 4, wherein said first filter means includes a low pass filter whose cutoff frequency is about 0.5 MHz, said second filter means includes a low pass filter whose cutoff frequency is about 1.5 MHz, and said predetermined frequency is about 0.5 MHz.

7. A wide band chrominance demodulator with color noise reduction function comprising:
   (a) first means responsive to a TV radio wave with a given field strength, for providing a composite color video signal contained in said TV radio wave, and generating a control potential corresponding to the field strength of said TV radio wave;
   (b) second means coupled to said first means for extracting from said composite video signal a luminance signal, an I signal including orange-cyanic color information and a Q signal including green-magenta color information;
   (c) third means coupled to said second means for extracting a lower frequency band I signal from said I signal;
   (d) fourth means coupled to said second means for extracting a higher frequency band I signal from said I signal;
   (e) fifth means coupled to said first and fourth means and responsive to said control potential, for enhancing the magnitude of said higher frequency band I signal when said control potential goes over a predetermined potential, and for reducing the magnitude of said higher frequency band I signal when said control potential goes under said predetermined potential, thereby to provide a controlled higher frequency band I signal;
   (f) sixth means coupled to said third and fifth means for combining said lower frequency band I signal and said controlled higher frequency band I signal to provide a controlled I signal; and
   (g) seventh means coupled to said second and sixth means for decoding said Q signal and said controlled I signal to provide color difference signals.

* * * * *